(No Model.)

A. H. DOUGLASS.
METALLIC WRAPPING FOR COTTON, &c.

No. 335,216. Patented Feb. 2, 1886.

UNITED STATES PATENT OFFICE.

ADDISON H. DOUGLASS, OF MEMPHIS, TENNESSEE.

METALLIC WRAPPING FOR COTTON, &c.

SPECIFICATION forming part of Letters Patent No. 335,216, dated February 2, 1886.

Application filed November 9, 1885. Serial No. 182,316. (No model.)

*To all whom it may concern:*

Be it known that I, ADDISON H. DOUGLASS, of Memphis, Tennessee, have invented a new and useful Method of Wrapping Cotton or other Articles of Merchandise in Bales, of which the following is a specification.

My invention relates to improvements in wrapping bales of cotton or other articles of merchandise by which it is proposed to wrap such bale or bales with sheet-iron or other metallic substance; and the objects of my invention are, first, to protect cotton or other articles of merchandise from loss by fire while in transit or in storage; and, second, to provide a less expensive method of wrapping such articles than any now in use.

I propose to attain these objects in the following manner, reference being had to the accompanying drawings.

Figure 1:
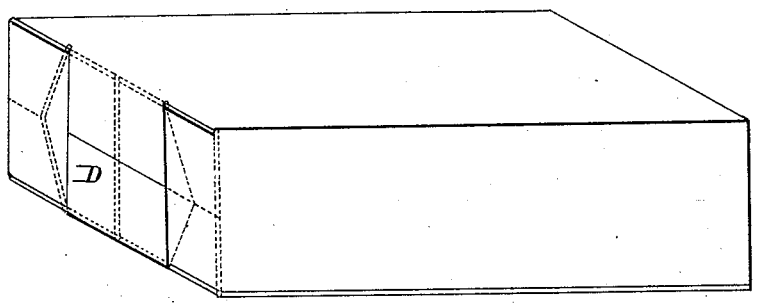
Figure 2:
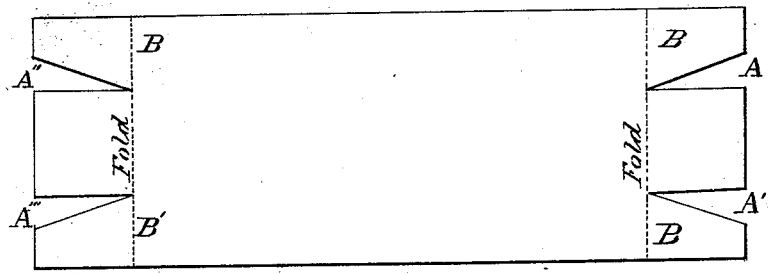
Figure 3:
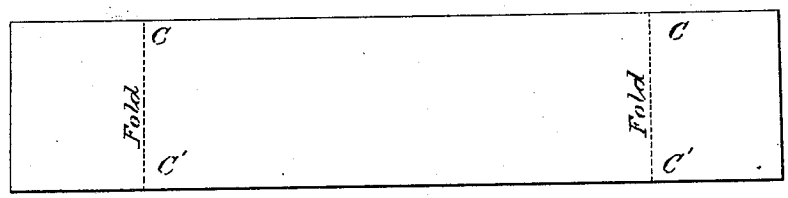

Figure 1 in the drawings represents a bale of cotton wrapped by my method, ready for the iron ties to be placed around it. Fig. 2 represents a plan view of a top or bottom sheet, the same to cover the top and bottom of the substance baled. Fig. 3 represents a plan view of the side piece to be used on each side of the bale.

The whole substance for baling to consist, first, of two sheets—one for the bottom and one for the top of the bale—and each of the same dimensions in length and width, each to be eighty-four (84) inches long and forty-two (42) inches wide, or longer or shorter or broader or narrower, as may be best adapted to the size of the bale or package wrapped, and each to have slots cut in each end, as shown in drawings, Fig. 2, A A' A" A"", as may adapt itself to the varied lengths and thickness of the bales to be covered, and to be folded at the end, as shown in drawings, Fig. 2, B B', and, second, to consist also of two sheets called "slips" or "side sheets," to be ninety (90) inches long and twenty-six (26) inches wide, longer or shorter, broader or narrower, as may be necessary. The side slips are to be folded around the ends of the bale at C C', Fig. 3, and thus made to fit the slots cut in the top and bottom sheets, as shown in Fig. 1, D. These latter sheets are for the purpose of filling the space on the sides between the edges of the top and bottom sheets, and in case of cotton-bales covered by this method may be withdrawn when the cotton-bale is compressed. The ends of the sheets will be fastened by ties of iron or other metal through slots cut in the sheets.

What I claim as my invention, and desire to secure by Letters Patent, is—

A wrapper for bales of cotton or other substances, consisting of sheet-iron or other metallic substances, made into slips, as herein described.

ADDISON H. DOUGLASS.

Witnesses:
C. R. BARTEAN,
J. J. BROOKS.